United States Patent
Mesa et al.

(10) Patent No.: US 11,692,604 B2
(45) Date of Patent: Jul. 4, 2023

(54) BARRIER WITH CABLE SYSTEM

(71) Applicant: McCue Corporation, Peabody, MA (US)

(72) Inventors: Teodoro A. Mesa, Lynn, MA (US); Frances Bravo, Waltham, MA (US); Evan Oswald, Marblehead, MA (US); David DiAntonio, Andover, MA (US)

(73) Assignee: McCue Corporation, Danvers, MA (US)

( * ) Notice: Subject to any disclaimer, the term of this patent is extended or adjusted under 35 U.S.C. 154(b) by 445 days.

(21) Appl. No.: 16/653,493

(22) Filed: Oct. 15, 2019

(65) Prior Publication Data

US 2020/0115864 A1 Apr. 16, 2020

Related U.S. Application Data

(60) Provisional application No. 62/910,189, filed on Oct. 3, 2019, provisional application No. 62/745,784, filed on Oct. 15, 2018.

(51) Int. Cl.
*E04H 17/14* (2006.01)
*F16F 7/12* (2006.01)
(Continued)

(52) U.S. Cl.
CPC ............ *F16F 7/12* (2013.01); *E01F 15/0453* (2013.01); *E01F 15/0469* (2013.01); *E01F 15/06* (2013.01); *E01F 15/146* (2013.01); *E04H 17/1413* (2013.01); *E04H 17/1417* (2013.01); *E04H 17/1447* (2021.01);
(Continued)

(58) Field of Classification Search
CPC ... E01F 15/04; E01F 15/0453; E01F 15/0461; E01F 15/086; E01F 15/14; E01F 15/145; E01F 15/146; E04H 17/1413; E04H 17/1465; E04H 17/22
See application file for complete search history.

(56) References Cited

U.S. PATENT DOCUMENTS 8,444,343 B2 * 5/2013 McCue ................... E01F 9/629
404/9
8,777,510 B2 * 7/2014 Maus ..................... E01F 15/086
404/6
(Continued)

FOREIGN PATENT DOCUMENTS

EP 2 418 325 * 2/2012 ............. E01F 15/14

*Primary Examiner* — Michael P Ferguson
(74) *Attorney, Agent, or Firm* — Occhiuti & Rohlicek LLP

(57) ABSTRACT

A protective barrier includes a first end piece including a first opening and a first anchoring member for securing the first end piece to a surface, a second end piece including a second opening and a second anchoring member for securing the second end piece to the surface, a rail extending between the first end piece and the second end piece, the rail having a first end disposed in the first opening of the first end piece and a second end disposed in the second opening of the second end piece, and a cable system including a first fastener coupled to the first anchoring member, a second fastener coupled to the second anchoring member, and a cable having a first end attached to the first fastener and a second attached to the second fastener, the cable extending from the first fastener, through the first opening, through the rail, through the second opening, and to the second fastener.

7 Claims, 6 Drawing Sheets

(51) Int. Cl.
*E01F 15/06* (2006.01)
*E01F 15/04* (2006.01)
*E01F 15/14* (2006.01)
*E04H 17/20* (2006.01)
*E04H 17/22* (2006.01)
*E01F 13/02* (2006.01)

(52) U.S. Cl.
CPC ......... *E04H 17/1465* (2021.01); *E04H 17/22* (2013.01); *E04H 17/23* (2021.01); *E01F 13/02* (2013.01); *E01F 15/0407* (2013.01); *E01F 15/14* (2013.01); *E04H 17/14* (2013.01); *F16F 2230/0023* (2013.01); *F16F 2230/0041* (2013.01)

(56) References Cited

U.S. PATENT DOCUMENTS

| | | | |
|---|---|---|---|
| 8,915,670 B2 * | 12/2014 | Ustach | E01F 15/00 404/9 |
| D771,277 S * | 11/2016 | McCue | D25/125 |
| 2013/0248791 A1 * | 9/2013 | Bullock | E01F 15/06 29/428 |
| 2015/0259866 A1 * | 9/2015 | McCue | E01F 15/141 256/66 |

* cited by examiner

BARRIER WITH CABLE SYSTEM

CROSS-REFERENCE TO RELATED APPLICATIONS

This application claims the benefit under 35 U.S.C. 119(e) of Provisional Application No. 62/910,189, filed Oct. 3, 2019 and Provisional Application No. 62/745,784, filed Oct. 15, 2018, the entire contents of which are incorporated herein by reference.

BACKGROUND

This invention relates to a barrier with a cable system.

Warehouses, distributions centers, factories, and similar facilities often have large stock handling equipment such as fork trucks which frequently move stock into, out of, and around the facility. In some examples, the stock is stored on shelving (e.g., pallet racks) and stock handling equipment must navigate through the shelving to move stock to and from the shelving. Some facilities may have other obstacles (e.g., support columns, walls, pedestrian walkways) which the stock handling equipment must navigate around as it travels through the facility.

As an operator navigates stock handling equipment through a facility, it is possible for the operator to inadvertently cause the stock handling equipment to collide with obstacles such as shelving, support columns, or walls or to encroach on pedestrian walkways. When stock handling equipment collides with an obstacle, both the obstacle and the stock handling equipment can become damaged. In the case of shelving, a strong enough collision can cause the shelving to collapse. In the case of an encroachment on a pedestrian walkway, a pedestrian can be seriously injured.

Because of the dangers associated with stock handling equipment, barriers are often installed to protect obstacles and walkways in facilities from interactions with stock handling equipment.

SUMMARY

Conventional barriers are often associated with a maximum load rating. If that maximum load rating is exceeded, conventional barriers fail. In the case of a catastrophic failure, parts of conventional barriers may break or separate in such a way that they are dangerously propelled into stock or pedestrians. Aspects described herein are directed to a cable system that prevents and mitigates catastrophic failure of barriers.

In a general aspect, a protective barrier includes a first end piece including a first opening and a first anchoring member for securing the first end piece to a surface, a second end piece including a second opening and a second anchoring member for securing the second end piece to the surface, a rail extending between the first end piece and the second end piece, the rail having a first end disposed in the first opening of the first end piece and a second end disposed in the second opening of the second end piece, and a cable system including a first fastener coupled to the first anchoring member, a second fastener coupled to the second anchoring member, and a cable having a first end attached to the first fastener and a second attached to the second fastener, the cable extending from the first fastener, through the first opening, through the rail, through the second opening, and to the second fastener.

Aspects may include one or more of the following features.

The first end of the cable may include a first hook for fastening the first end of the cable to the first fastener and the second end of the cable may include a second hook for fastening the second end of the cable to the second fastener. The first anchoring member may be a shock absorbing anchoring member and the second anchoring member may be a shock absorbing anchoring member. The first fastener may form a part of the first anchoring member and the second fastener may form a part of the second anchoring member. The cable may be a braided steel cable. The cable may be a nylon cable.

The rail may be formed from a plastic material. The rail may have a cavity miming along its length. The cable may extend through the cavity running along the length of the rail. The first end of the cable may be fastened to the first fastener by welding and the second end of the cable may be fastened to the second fastener by welding.

The first anchoring member and the first fastener may be disposed inside of the first end piece and the second anchoring member and the second fastener may be disposed inside of the second end piece.

The first end of the cable may include a first attachment member coupled to the first fastener and the second end of the cable may include a second attachment member coupled to the second fastener. The protective barrier may include a first pin coupling the first attachment member to the first fastener and a second pin coupling the second attachment member to the second fastener. The first fastener may include a first eye hook, the second fastener may include a second eye hook, the first attachment member may include a first loop of cable, and the second attachment member may include a second loop of cable. The first pin may extend through the first eye hook and the first loop of cable and the second pin may extend through the second eye hook and the second loop of cable.

Aspects may have one or more of the following advantages.

Aspects prevent and/or mitigate catastrophic failure of barriers and therefore prevent damage to stock and/or injury to pedestrians or other workers nearby the barrier. Upon failure of the barrier, parts of the barrier are prevented from being propelled in an uncontrolled manner from the barrier's location.

Aspects limit a maximum deflection of the plastic bumper rail, making the barrier design well suited to meet or exceed a number of industry standards.

Aspects are capable of sustaining a greater force of impact than some conventional barriers due to the use of a cable system to bolster the strength of the barrier. Aspects are able to absorb impact and return to their original state.

Aspects are capable of minimizing catastrophic damage in the event that the force of an impact is greater than that which would otherwise be withstood by conventional barriers due to the use of a cable system to bolster the strength of the barrier.

Some aspects advantageously include a pin-based cable system that couples the rails of the protective barriers and the posts of the protective barriers to ensure that any load due to unintentional collisions is distributed throughout the entire protective barrier.

Other features and advantages of the invention are apparent from the following description, and from the claims.

DESCRIPTION

1 Single Height Protective Barrier

Figure 1:
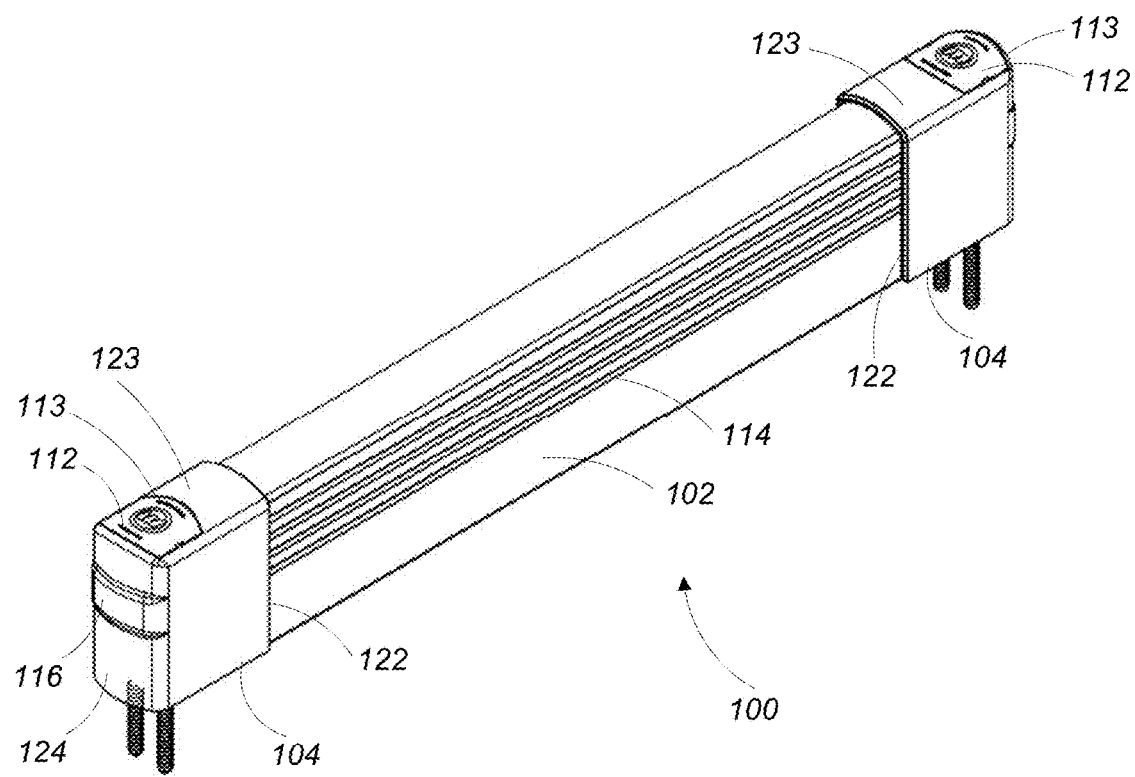
FIG. 1 is a protective barrier.
Figure 2:
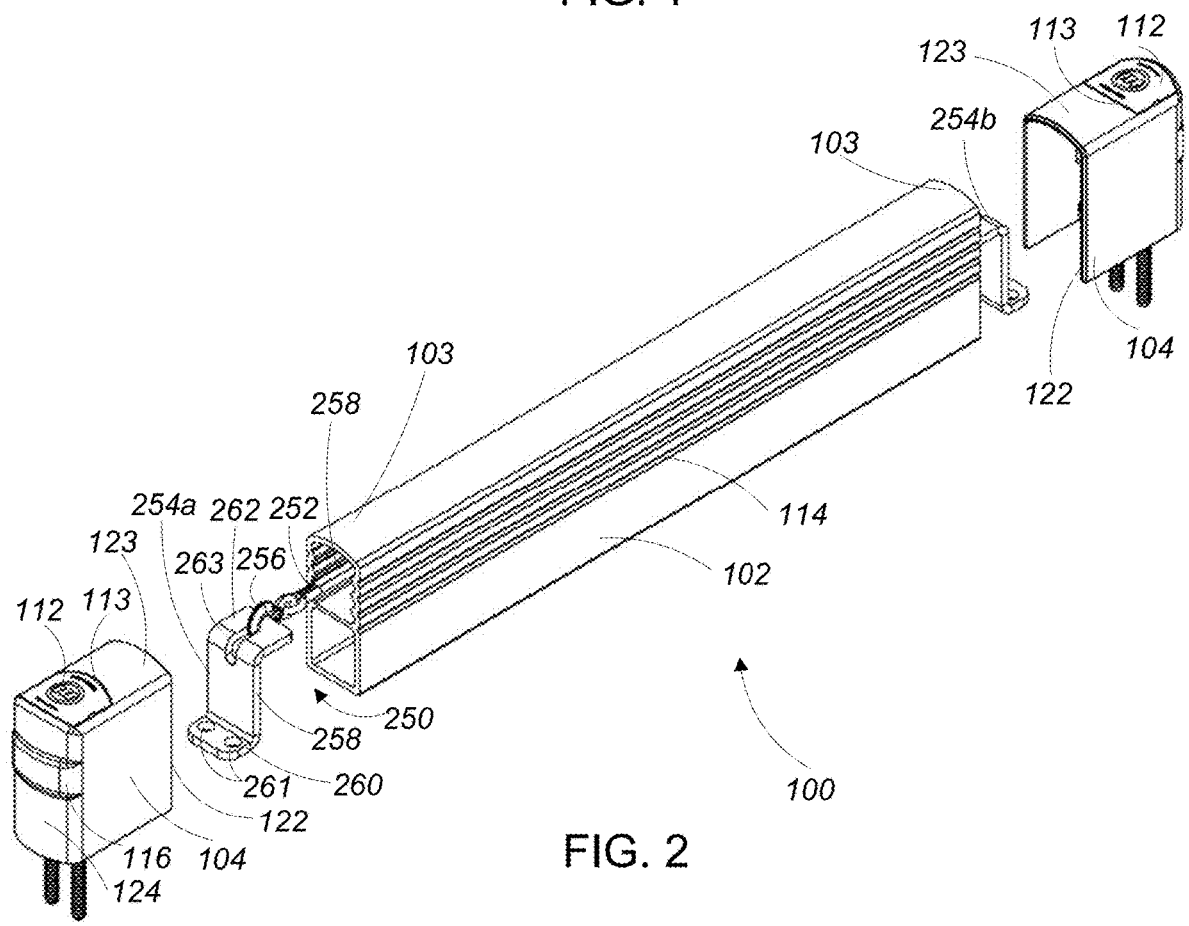
FIG. 2 is an exploded view of the protective barrier of FIG. 1 showing a cable system.

Referring to FIG. 1 and FIG. 2, a protective barrier 100, typically configured to protect an end of a shelf (e.g., a pallet rack used in warehouse, not shown) from unintended collisions, is shown. The protective barrier 100 includes a plastic bumper rail 102 and two rounded metallic end caps 104. The plastic bumper rail 102 is held fixed between the two rounded metallic end caps 104 via the openings 122 in each of the metallic end caps 104. The plastic bumper rail 102 includes two ends 103, each of which is inserted into the openings 122 of the metallic end caps 104. The protective barrier 100 is anchored into the ground by fastening the two rounded metallic end caps 104 to the ground using an anchoring mechanism (as is described in greater detail below).

As seen in detail in FIG. 2, the protective barrier 100 further includes a cable system 250 extending therethrough. The cable system 250 includes a cable 252 held between a first bracket 254a and a second bracket 254b, where each bracket is affixed inside each of the two rounded metallic end caps 104. The cable 252 is shown to be contained within the plastic bumper rail 102.

In some examples, the plastic bumper rail 102 is a hollow part formed by extruding high density polyethylene (HDPE). The plastic bumper rail 102 includes ribs 114 which increase the amount of plastic material present in the wall of the plastic bumper rail 102, thereby increasing the rigidity and collision absorption capability of the plastic bumper rail 102.

Regarding the rounded metallic end caps 104, each rounded metallic end cap 104 is a substantially cuboid-shaped metallic member with a rounded outer wall 124 opposite the opening 122, and a rounded top wall 123. The outer wall 124 includes a rounded protrusion 116 which is intended to receive and deflect the force of any object colliding with the metallic end cap 104. Each of the rounded metallic end caps 104 includes an anchoring mechanism access opening 113 which has a cover 112 placed thereon. The cover 112 covers the anchoring mechanism access opening 113 to hide the anchoring mechanism from view and prevent debris from entering the anchoring mechanism.

In some examples, each of the brackets 254a, 254b is a metallic member with a substantially 's-shaped' profile. Each bracket has a body 258 with a first flange 260 extending from the body in a first direction perpendicular to the body and a second flange 262 extending from the body 258 in a second direction, opposite the first direction, perpendicular to the body 258.

The first flange 260 includes two anchoring openings 261 configured to receive members of the anchoring mechanism. In some examples, the cable 252 is a braided steel cable (sometimes referred to as 'wire rope') with fasteners 256 (e.g., hooks) attached to its ends. In those examples, the second flange 262 includes a hook-receiving opening 263 configured to receive the hooks 256 that are attached to the ends of the cable 252. It is noted that other suitable fastening methodologies (e.g., welding, nuts and bolts, etc.) can be used to fasten the cable to the brackets instead of the hook-based system described herein.

The first bracket 254a and second bracket 254b are installed in their respective rounded metallic end caps 104 (as is described in greater detail below). Opposite ends of the cable 252 are fastened to the brackets 254a, 254b. In some embodiments, the opposite ends of the cable 252 are fastened via hooks 256 attached to the ends of the cable 252. The hooks 256 interact with hook-receiving openings 263 in the brackets 254a, 254b to attach the cable 252 to the brackets 254a, 254b. The cable 252 extends from the first bracket 254a through a cavity 258 extending along a length of the plastic bumper rail 102.

Figure 3:
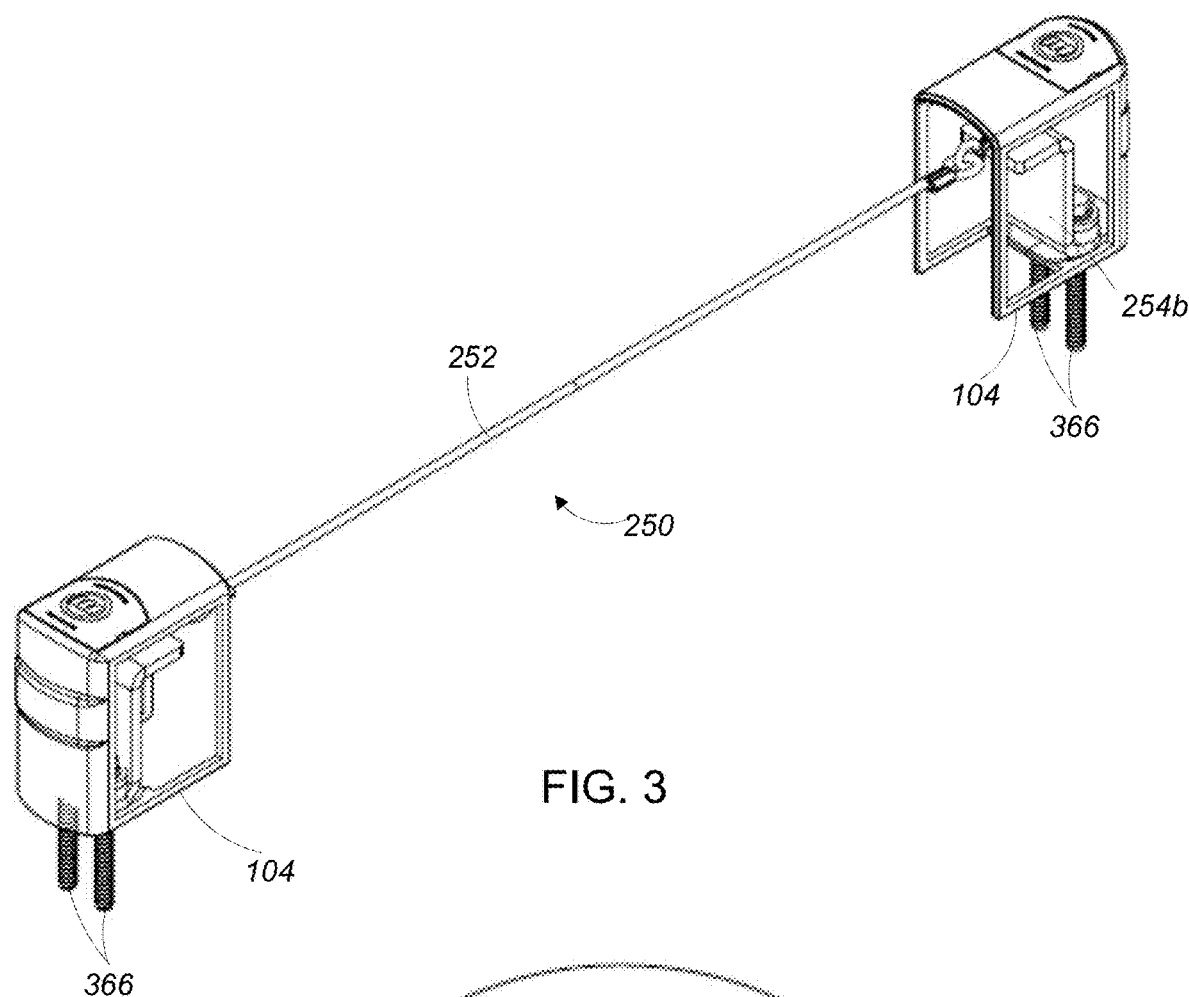
FIG. 3 is a cut-away view of the protective barrier of FIG. 1 with a plastic bumper rail removed to expose a cable of the cable system.

Referring now to FIG. 3, a view of the protective barrier 100 without a plastic bumper rail is shown, with a partial cut-away view of the two rounded metallic end caps 104 provided. Each of the two rounded metallic end caps 104 are shown to be connected to a respective anchoring fastener 366, where each anchoring fastener is shown to extend substantially vertically below its respective rounded metallic end cap 104.

Figure 4:
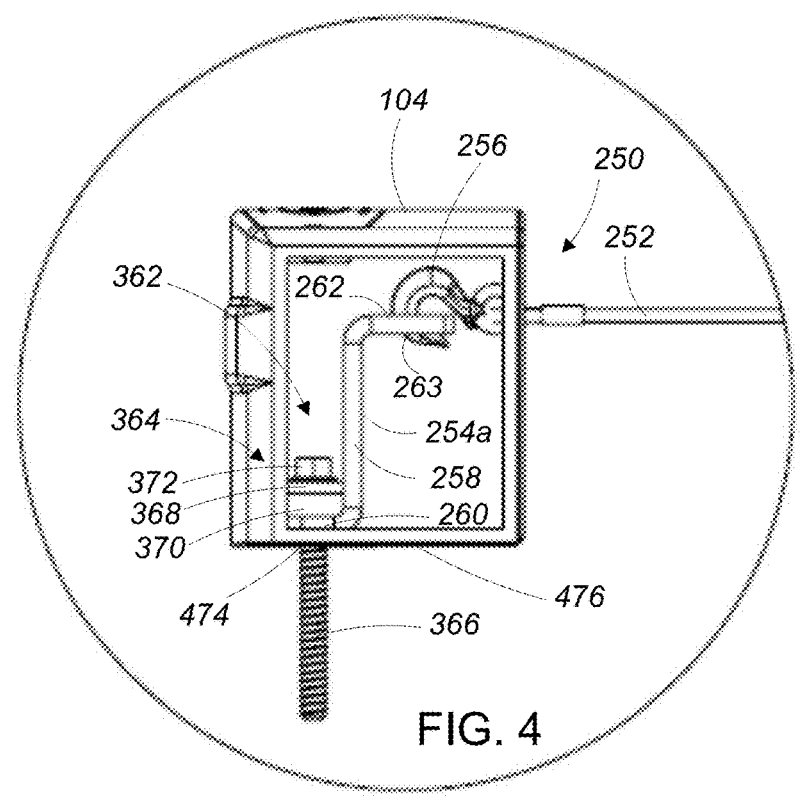
FIG. 4 is a cut-away detail view of one of the rounded metallic end caps of the protective barrier of FIG. 1.

Referring to FIG. 4, a cut-away view of an exemplary rounded metallic end cap 104 is shown, giving a detailed view of the shock absorbing mechanism 362 disposed in the rounded metallic end cap 104. The shock absorbing mechanism 362 is shown to be fastened to a bottom wall 476 of the rounded metallic end cap 104 via two openings 474. The two openings 474 are configured to each receive a shock absorbing assembly 364.

Further referring to FIG. 4, each shock absorbing assembly 364 includes an anchoring fastener 366 (e.g., a bolt or a piece of rebar), a washer 368, a shock absorber 370. In some examples, both the washer 368 and the shock absorber 370 include a central through hole for receiving a portion of the anchoring fastener 366. In some examples, each anchoring fastener 366 is a threaded rod and each shock absorbing assembly 364 includes a threaded nut 372 that screws on to the anchoring fastener 366. In some examples, the shock absorbers 370 are made of an elastic material such as neoprene or ethylene propylene diene monomer (EPDM).

Referring generally now to FIG. 3 and FIG. 4, when a shock absorbing assembly 362 is assembled in the rounded metallic end cap 104, the two anchoring openings 261 in the first flange 260 of the bracket 254 are aligned with two openings 474 in a bottom wall 476 of the rounded metallic end cap 104. The shock absorbers 370 are disposed on the first flange 260 of the bracket 254 with their central through holes aligned with the anchoring openings 261 in the first flange 260. The washers 368 are disposed on the shock absorbers 370 with their central through holes aligned with the central through holes of the shock absorbers 370 (and with the anchoring openings 261 in the first flange 260).

Figure 5:
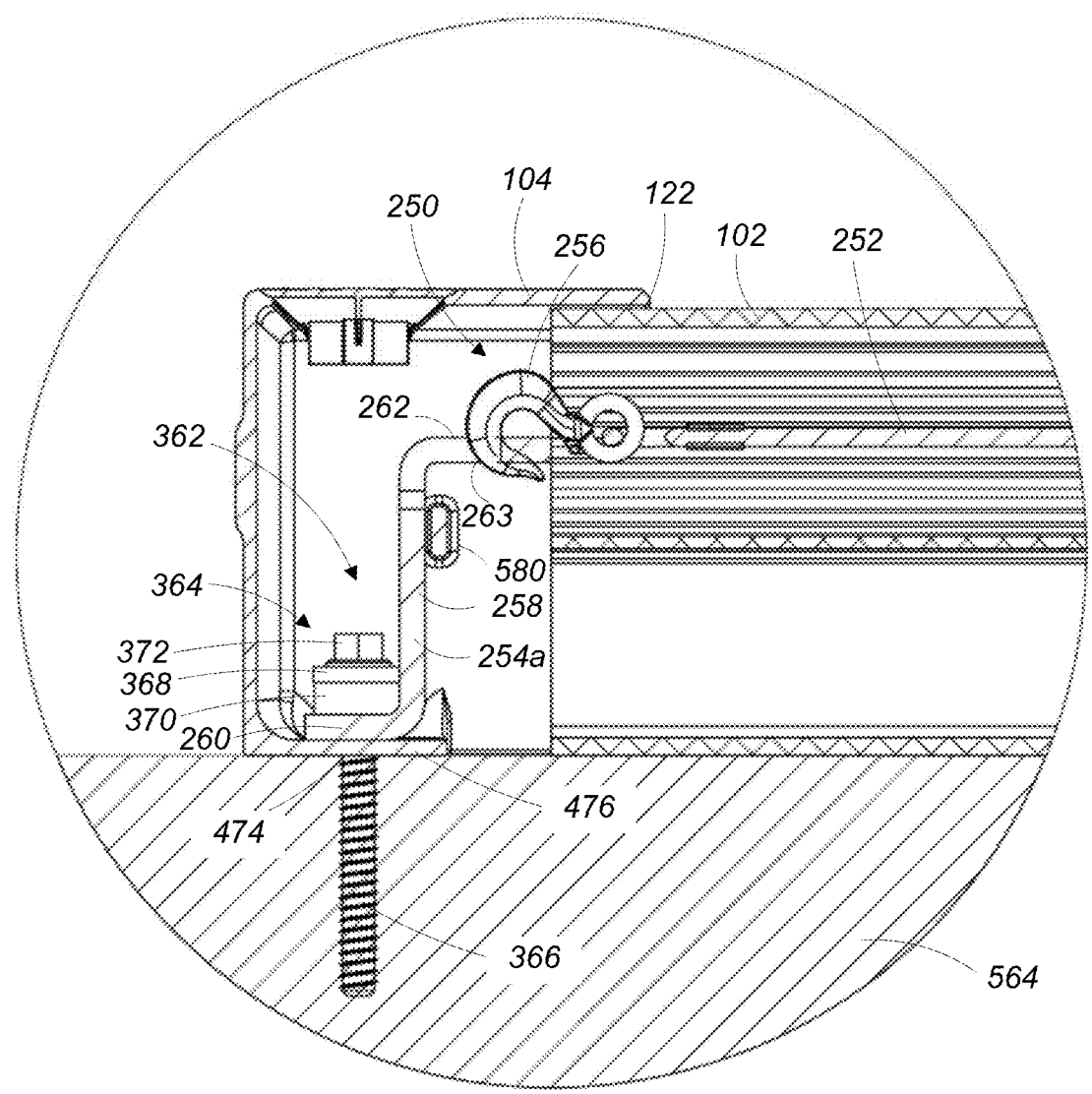
FIG. 5 is a cross-sectional view of one end of the protective barrier of FIG. 1.

Referring to FIG. 5, a cut-away view of a rounded metallic end cap 104 with a shock absorbing mechanism 362 disposed inside is shown. The shock absorbing mechanism 362 is shown to secure the metallic end cap 104 to a surface 564 via the anchoring fastener 366 of its shock absorbing assembly 364. Specifically, the anchoring fastener 366 extends through the central through hole of the washer 368, through the central through hole of the shock absorber 370, through the anchoring openings 261 (seen in FIG. 1) in the first flange 260 of the bracket 254, through the openings 474 in the bottom wall 476 of the rounded metallic end cap 104, and into a surface 564, where it is fixed. The threaded nut 372 is screwed onto a free end of the anchoring fastener 366 and holds the washer 368, the shock absorber 370, and the first flange 260 of the bracket 254 against the bottom wall 476 of the rounded metallic end cap 104.

In some examples, the openings 474 in the bottom wall 476 of the rounded metallic end cap 104 and/or the anchoring openings 261 in the first flange 260 of the bracket 254 have an inner diameter that is larger than an outer diameter of the anchoring fastener 366. This difference in diameters allows the bracket 254 and/or the rounded metallic end cap 104 to pivot about the shock absorbing mechanism 362 when sufficient force is applied to the cable system 250 and/or the plastic bumper rail 102.

In some examples, the body 258 of each of the brackets 254 rests against an internal rib 580 extending between two sidewalls of the rounded metallic end cap 104, providing additional support for the cable system 250.

2 Double Height Protective Barrier

Figure 6:
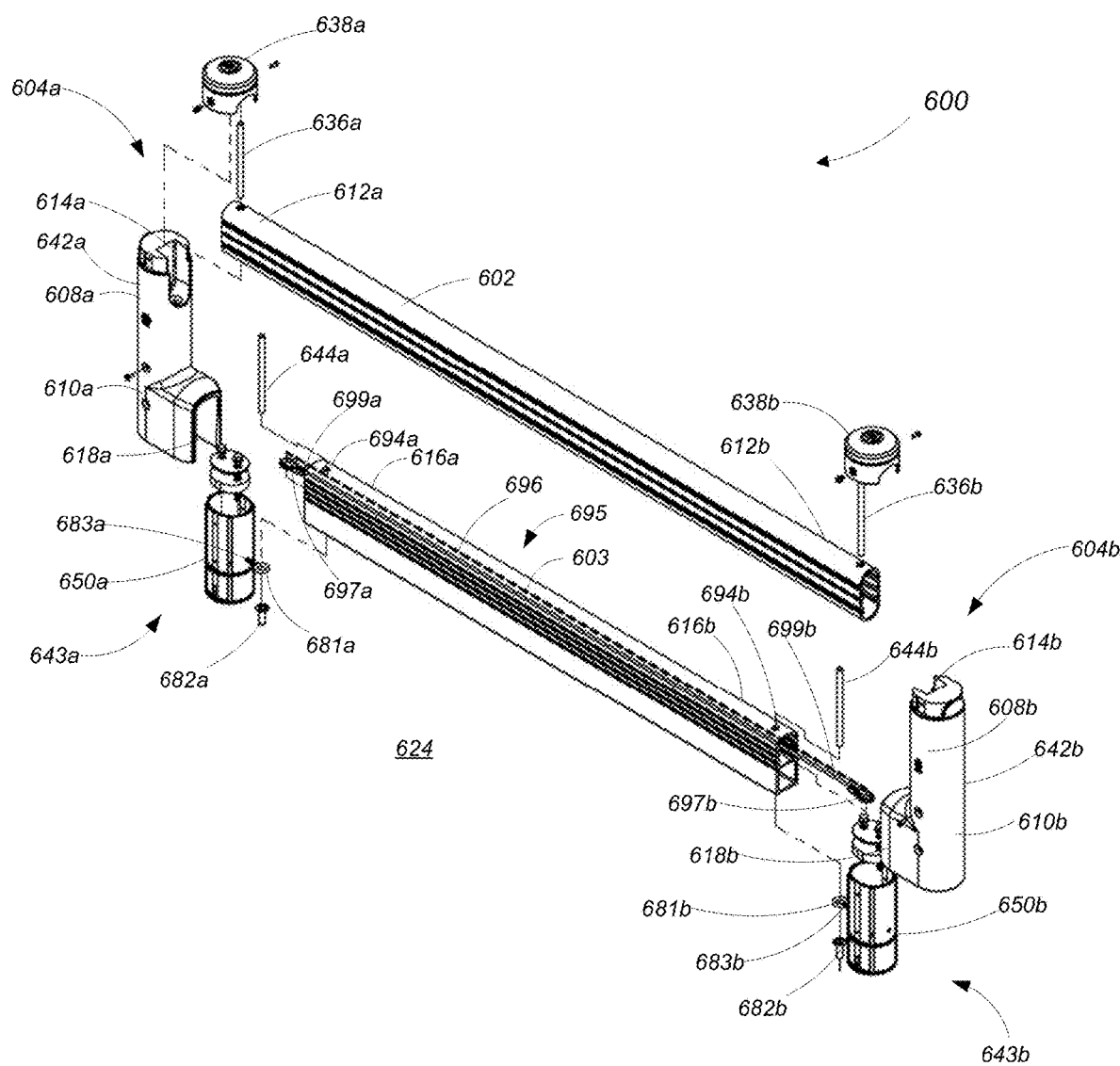
FIG. 6 is an exploded view of a protective barrier utilizing another cable system.
Figure 7:
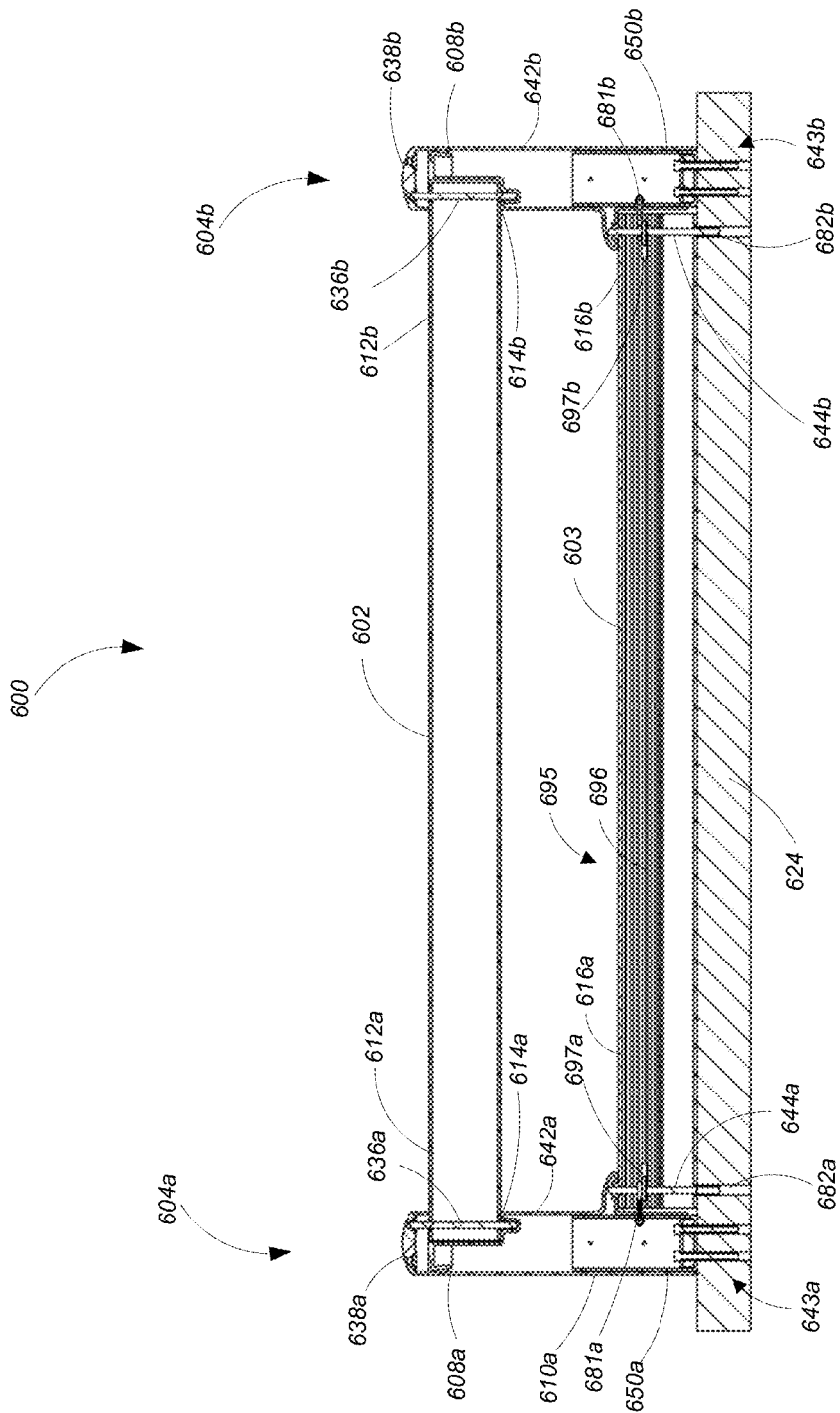
FIG. 7 is a cut-away view of the protective barrier of FIG. 6.

Referring to FIG. 6 FIG. 7, in another embodiment, a protective barrier 600 with a configuration similar to the protective barrier described in U.S. patent application Ser. No. 15/940,281 (which is hereby incorporated herein by reference) is configured to protect a warehouse asset (e.g., a pallet rack, a pedestrian walkway, or a support column) from unintended collisions. Very generally, the protective barrier 600 includes a cable system to reinforce the barrier in the event of an unintended collision.

The protective barrier 600 includes a first rounded end post 604a and second rounded end post 604b, each of which is anchored into the ground using a corresponding anchoring assembly 643. The first rounded end post 604a and the second rounded end post 604b are mirror images of each other. The rounded end posts 604a-b are interconnected by plastic bumper rails 602, 603.

When the protective barrier 600 is assembled, an upper portion 608a of the first rounded end post 604a is connected to an upper portion 608b of the second rounded end post 604b by an upper plastic bumper rail 602. The upper plastic bumper rail 602 has a first end 612a inserted into an upper opening 614a of the first rounded end post 604a and a second end 612b inserted into an upper opening 614b of the second rounded end post 604b.

A lower portion 610a of the first rounded end post 604a is connected to a lower portion 610b of the second rounded end post 604b by a lower plastic bumper rail 603. The lower plastic bumper rail 603 has a first end 616a inserted into a lower opening 618a of the first rounded end post 604a and second end 616b inserted into a lower opening 618b of the second rounded end post 604b.

A cable system 695 is disposed inside a hollow interior of the lower plastic bumper rail 603 and extends between the first and second rounded end posts 604a-b. The cable system 695 includes a first eye hook 681a, a second eye hook 681b, and a cable 696.

The first eye hook 681a is installed in a through hole 683a in a sidewall of the inner core 650a of the first rounded end post 604a and the second eye hook 681b is installed in a through hole 683b in a sidewall of the inner core 650b of the second rounded end post 604b. In some examples, the eye hooks 681a-b are secured by a nut on an inside of the inner cores 650a-b, while in other examples, the through holes 683a-b in the sidewalls of the inner cores 650a-b are threaded and threaded eye hooks are screwed into the through holes.

The cable 696 includes a first loop 697a at a first end 699a of the cable and a second loop 697b at a second end 699b of the cable. The "eyes" of the eye hooks 681a-b and the loops 697a-b of the cable 696 are both dimensioned to accommodate lower pins 644a-b (respectively), as is described in greater detail below.

When assembled (as described below), the cable system 695 securely couples the inner cores 650a-b of the rounded end posts 604a-b to each other and to the lower plastic bumper rail 603 via the lower pins 644a-b.

The first rounded end post 604a is an assembly including a cap 638a, a first upper pin 636a, an outer shell 642a, a first lower pin 644a, and an anchoring assembly 643a. The anchoring assembly includes an inner core 650a and a first lower pin-receiving socket 682a. Similarly, the second rounded end post 604b is an assembly including a cap 638b, a second upper pin 636b, an outer shell 642b, a second lower pin 644b, and an anchoring assembly 643b. The anchoring assembly includes an inner core 650b and a second lower pin-receiving socket 682b.

The anchoring assemblies 643a-b include several other features that are described in U.S. patent application Ser. No. 15/940,281 (and will not be repeated herein for the sake of brevity), and are configured to securely attach the rounded end posts 604a-b and the ends 616a-b of the lower plastic bumper rail 603 to a mounting surface 624.

The first end 616a of the lower plastic bumper rail 603 includes a through hole 694a. When the protective barrier 600 is assembled, the through hole 694a of the first end 616a of the lower plastic bumper rail 603 is aligned with the first lower pin-receiving socket 682a and the first lower pin 644a is positioned through the through hole 694a with a distal end of the first lower pin 644a received in the first lower pin-receiving socket 682a.

Similarly, the second end 616b of the lower plastic bumper rail 603 includes a through hole 694b. The through hole 694b of the second end 616b of the lower plastic bumper rail 603 is aligned with the second lower pin-receiving socket 682b and the second lower pin 644b is positioned through the through hole 694b with a distal end of the second lower pin 644b received in the second lower pin-receiving socket 682b.

When installed as described above, the first lower pin 644a also extends through the first eye hook 681a and through the first loop 697a of the cable 696, thereby coupling the first end 699a of the cable 696 to the first eye hook 681a via the first lower pin 644a. Similarly, the second lower pin 644b extends through the second eye hook 681b and through the second loop 697b of the cable 696, thereby coupling the second end 699b of the cable 696 to the second eye hook 681b via the second lower pin 644b. The cable 696 extends from the first lower pin 644a to the second lower pin 644b and through the hollow interior of the lower plastic bumper rail 603. In general, the cable 696 is held substantially taut between the first lower pin 644a to the second lower pin 644b.

The remaining assembly of the protective barrier 600 proceeds as described in U.S. patent application Ser. No. 15/940,281 and is not repeated herein for the sake of brevity.

Alternatives

In some examples, the bracket is an integral part of the rounded metallic end cap (e.g., the bracket and end cap are sand cast as a single integral part).

In some examples, the cable system limits a maximum deflection of the plastic bumper rail. In such examples, the rounded metallic end caps may be configured to retain the ends of the plastic bumper rail in their openings when the maximum deflection is reached (i.e., the plastic bumper rail does not 'pop out' of the rounded metallic end caps).

The cable system described above includes a braided steel cable. It is noted, however that other types of cables such as nylon cables, elastomer cables, solid steel (or other metal) cables, plastic cables, or any other suitable cable material can be used.

The plastic bumper rail described above includes ribs. It is noted, however that other embodiments of the plastic bumper rail do not include ribs.

In some examples, the pins describe herein are metallic pins. In other examples, the pins are plastic pins.

Figure 8:
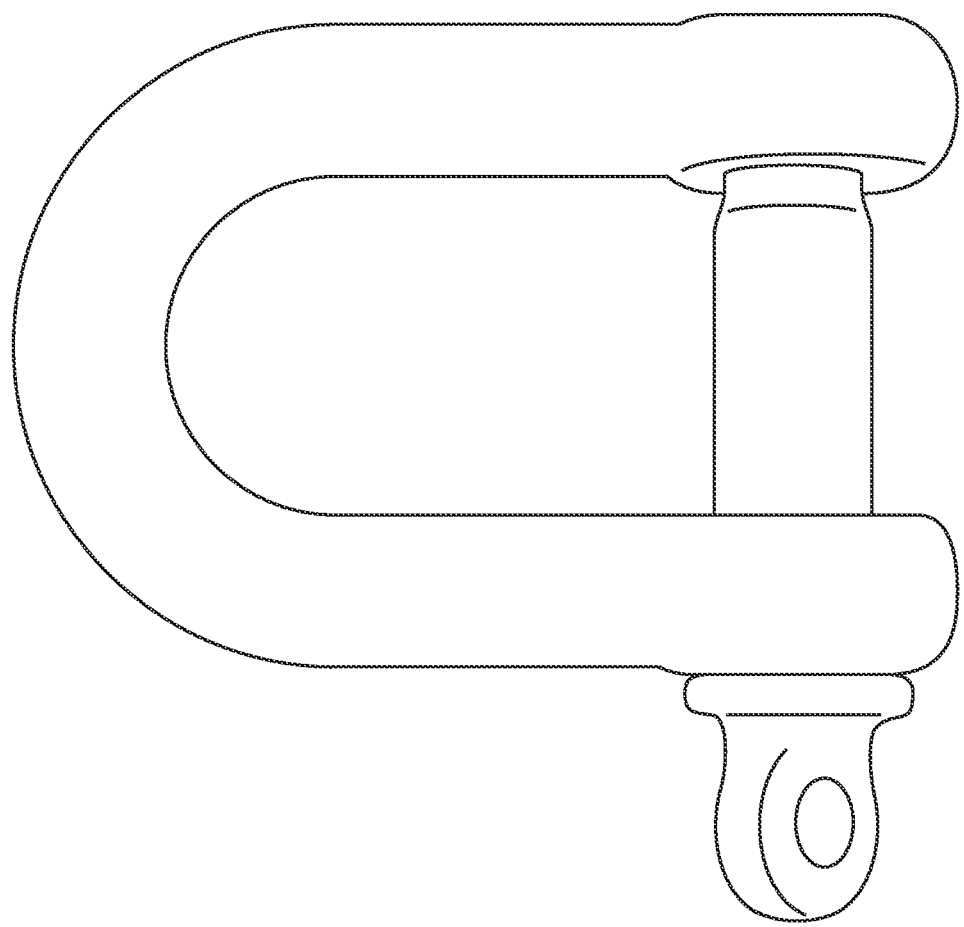
FIG. 8 is a shackle fastener.

In some examples, the opposite ends of the cable are fastened to the brackets using "shackles" such as the shackle 856 shown in FIG. 8. As is the case with other types of fasteners, the shackles 856 are attached to the ends of the cable and interact with receiving openings in the brackets to attach the cable to the brackets.

The cable system is described above in the context of one exemplary barrier. But the same cable system can be used to improve any number of barriers, including but not limited to the barriers and other protective apparatuses described in U.S. Pat. Nos. 9,103,163, 10,060,154, 9,644,393, 9,732,485, and U.S. patent application Ser. No. 15/940,281, the contents of which are incorporated herein in their entirety.

It is to be understood that the foregoing description is intended to illustrate and not to limit the scope of the invention, which is defined by the scope of the appended claims. Other embodiments are within the scope of the following claims.

What is claimed is:

1. A protective barrier comprising:
a first hollow end piece including a first rail receiving opening;
a first anchoring member disposed in the first hollow end piece and securing the first hollow end piece to a surface, the first anchoring member including a first bracket with a first lower flange portion and a first upper flange portion, the first lower flange portion of the first bracket having a first fastener extending therethrough, through a portion of the first hollow end piece, and into the surface;
a second hollow end piece including a second rail receiving opening;
a second anchoring member disposed in the second hollow end piece and securing the second hollow end piece to the surface, the second anchoring member including a second bracket with a second lower flange portion and a second upper flange portion, the second lower flange portion of the bracket having a second fastener extending therethrough, through a portion of the second hollow end piece, and into the surface;
a hollow rail extending between the first hollow end piece and the second hollow end piece, the hollow rail having a first end disposed in the first rail receiving opening of the first hollow end piece, a second end disposed in the second rail receiving opening of the hollow second end piece, and a length extending between the first end and the second end, the hollow rail having a channel extending along the length;
a cable extending through the channel of the hollow rail and having a first end fastened to the first upper flange portion of the first bracket and a second end fastened to the second upper flange portion of the second bracket;
wherein the protective barrier includes the following configurations:
a first configuration where the hollow rail is undeformed and the cable is separated from an interior surface of the channel in the hollow rail by a first distance, the first configuration being associated with an unimpacted state of the protective barrier,
a second configuration, upon impact, where the hollow rail is deformed by an impact and the cable is separated from the interior surface of the channel in the rail by a second distance, less than the first distance, the second configuration being associated with a first level of impact absorption where the rail absorbs a force of the impact, and
a third configuration, upon impact, where the hollow rail is deformed by the impact and the cable in in contact with the interior surface of the channel in the hollow rail, the third configuration being associated with a second level of impact absorption greater than the first level of impact absorption where the rail and the cable absorb a force of the impact, the cable preventing the hollow rail from being propelled from first and second end pieces in an uncontrolled manner.

2. The protective barrier of claim 1 wherein the first end of the cable includes a first hook for fastening the first end of the cable to the first upper flange portion of the first bracket and the second end of the cable includes a second hook for fastening the second end of the cable to the second upper flange portion of the second bracket.

3. The protective barrier of claim 1 wherein the first fastener comprises a shock absorbing anchoring member and the second fastener comprises a shock absorbing anchoring member.

4. The protective barrier of claim 1 wherein the cable is a braided steel cable.

5. The protective barrier of claim 1 wherein the cable is a nylon cable.

6. The protective barrier of claim 1 wherein the rail is formed from a plastic material.

7. The protective barrier of claim 1 wherein the first end of the cable is fastened to the first upper flange portion of the first bracket by welding and the second end of the cable is fastened to the second upper flange portion of the second bracket by welding.

* * * * *